United States Patent
Tsalmon et al.

(10) Patent No.: US 10,289,309 B2
(45) Date of Patent: May 14, 2019

(54) AUTOMATIC DETECTION OF MULTIPLE STREAMS

(71) Applicant: Toshiba Memory Corporation, Minato-Ku, Tokyo (JP)

(72) Inventors: Shimon Tsalmon, Kfar-Saba (IL); Yaron Klein, Raanana (IL)

(73) Assignee: Toshiba Memory Corporation, Tokyo (JP)

( * ) Notice: Subject to any disclaimer, the term of this patent is extended or adjusted under 35 U.S.C. 154(b) by 203 days.

(21) Appl. No.: 15/262,668

(22) Filed: Sep. 12, 2016

(65) Prior Publication Data

US 2018/0074700 A1    Mar. 15, 2018

(51) Int. Cl.
   *G06F 13/00*   (2006.01)
   *G06F 3/06*    (2006.01)

(52) U.S. Cl.
   CPC ............ *G06F 3/061* (2013.01); *G06F 3/0656* (2013.01); *G06F 3/0659* (2013.01); *G06F 3/0679* (2013.01)

(58) Field of Classification Search
   None
   See application file for complete search history.

(56) References Cited

U.S. PATENT DOCUMENTS

| | | | |
|---|---|---|---|
| 6,092,168 A | 7/2000 | Voigt | |
| 7,376,895 B2 | 5/2008 | Tsao | |
| 7,765,378 B1 | 7/2010 | Georgiev | |
| 8,848,710 B2 | 9/2014 | Sundarrajan et al. | |
| 9,251,295 B2 | 2/2016 | Adams et al. | |
| 2007/0198793 A1 | 8/2007 | Jafri et al. | |
| 2010/0174876 A1 | 7/2010 | Kasahara et al. | |
| 2010/0223221 A1 | 9/2010 | Gardner et al. | |
| 2014/0279837 A1 | 9/2014 | Guo et al. | |
| 2014/0310574 A1 | 10/2014 | Yu et al. | |
| 2015/0339319 A1 | 11/2015 | Malina | |
| 2018/0004416 A1 | 1/2018 | Okita | |

FOREIGN PATENT DOCUMENTS

| | | |
|---|---|---|
| CA | 2084132 A1 | 7/1993 |
| CN | 104166651 A | 11/2014 |

*Primary Examiner* — Midys Rojas
(74) *Attorney, Agent, or Firm* — White & Case LLP

(57) ABSTRACT

A method of storing data in a storage device is disclosed. In one embodiment, the method includes receiving a write command comprising write data to be written to the storage device. The method further includes determining whether the write data belongs to a first open stream of write data if a logical block address corresponding to the write data is consecutive to, or within a given distance from, a logical block address of the first open stream of write data. The method further includes updating the logical block address of the first open stream of write data to the logical block address corresponding to the write data and resetting a timer of the first open stream of write data if the write data is determined to belong to the first open stream of write data. The method further includes closing the first open stream of write data when the timer expires.

28 Claims, 6 Drawing Sheets

AUTOMATIC DETECTION OF MULTIPLE STREAMS

FIELD OF THE INVENTION

The present invention generally relates to storing data in a storage device.

BACKGROUND OF THE INVENTION

Flash-based storage media, such as solid-state drives (SSDs), comprise flash cells arranged in units of planes, blocks, and pages. Each plane contains a number of blocks, which are the smallest unit that can be erased. Each block contains a number of pages, which are the smallest unit that can be written with data. Within an SSD, a memory controller is responsible for mapping the logical block addresses of application data to be written to or read from the physical flash pages. Application data may be in the form of objects, such as a document, an image, a multimedia file, etc.

FIG. 1 is a block diagram of a host device 100 storing data objects 104, 106, 108, and 110 in a storage device 102, according to the prior art. The storage device 102 is a flash-based device, such as an SSD. As shown in FIG. 1, the host device 100 has one or more software applications simultaneously writing objects 104, 106, 108, and 110 to the storage device 102. When multiple objects 104, 106, 108, and 110 are being written to the storage device 102 simultaneously (i.e. in parallel) by an application or applications running on the host device 100, the chunks of data 104a-e, 106a-e, 108a-e, and 110a-e that make up the objects 104, 106, 108, and 110, respectively, become blended with other chunks corresponding to the other objects, resulting in fragmentation of the data when it is stored in blocks 101, 103, 105, and 107 of the storage device 102.

In other words, as shown in FIG. 1, different chunks of data 104a-e, 106a-e, 108a-e, and 110a-e for the various objects will end up being stored in the same block 101, 103, 105, or 107 within the storage device 102. Subsequently, when an application deletes an object, such as object 104, the corresponding pages storing objects 104a-e will need to be invalidated (denoted by an "x" in FIG. 1) from the various blocks 101, 103, 105, and 107. The blocks 101, 103, 105, and 107 become heavily fragmented, containing both valid and invalid pages of data, and require garbage collection to copy the invalid pages into other blocks containing only valid pages in order for the remaining block with invalid pages to be completely erased to form a fresh, re-useable block.

The heavy fragmentation of the blocks, and the accompanying garbage collection that is needed to clear invalid pages, results in increased write amplification (the ratio of data written by the flash memory of the storage device 102 compared to the data requested to be written by the host device 100) and significantly degrades the performance of the storage device 102.

What is needed, therefore, is an improved scheme for storing data in a flash-based storage device that minimizes the fragmentation of the storage device's blocks, reducing write amplification and increasing the performance of the storage device.

BRIEF DESCRIPTION OF THE INVENTION

In one embodiment, a method for storing data in a storage device includes receiving a write command comprising write data to be written to the storage device, and determining whether the write data belongs to a first open stream of write data if a logical block address corresponding to the write data is consecutive to, or within a given distance from, a logical block address of the first open stream of write data. In one embodiment, the distance is adjustable. The distance may be adjusted based on a size of an object to be written, the type of object to be written, the location of related metadata, and so on. In one embodiment, the distance may be defined by setting a window having a lower and upper LBA within which the LBAs of the first open stream of write data is contained.

The method further includes updating the logical block address of the first open stream of write data to the logical block address corresponding to the write data and resetting a timer of the first open stream of write data, if the write data is determined to belong to the first open stream of write data. The method further includes closing the first open stream of write data when the timer expires. In one embodiment, the method further includes writing the first open stream of write data to a block of a flash memory device of the storage device after the first open stream of write data is closed.

In one embodiment, the storage device comprises an SSD. In one embodiment, the timer has a predetermined time. In another embodiment, the method further includes adjusting a time of the timer based on a frequency of receiving write data belonging to the first open stream of write data. In another embodiment, the method further includes adjusting a time of the timer based on the distance of the LBA of the received write data to the LBAs of the write data belonging to the first open stream of write data.

In one embodiment, the method further includes creating a second open stream of write data having a logical block address of the write data and starting a second timer corresponding to the second open stream of write data, if the write data is not determined to belong to the first open stream of write data. The method further includes closing the second open stream of write data when the second timer expires. In one embodiment, the method further includes writing the second open stream of write data to a block of a flash memory device of the storage device after the second open stream of write data is closed.

In one embodiment, the method further includes receiving a read command for a read data stored in the storage device. The method further includes determining whether the read data corresponding to the read command is part of a stream of data. The method further includes fetching the read data and placing remaining stream of data in a memory buffer if the read data is determined to belong to the stream of data, and fetching the read data if the read data is not determined to belong to any stream of data.

In one embodiment, the method further includes detecting an object format of the write data, and determining whether the object format corresponds to a known object format. The method further includes opening a second stream of write data and starting a second timer for the second stream of write data if the object format is determined to correspond to the known object format. The method further includes closing the second stream of write data when the second timer expires. In one embodiment, the method further includes extracting stream information from the write data if the object format of the write data corresponds to the known object format. In one embodiment, extracting stream information comprises scanning a header of the write data. In one embodiment, the method further comprises closing the second stream of write data when the stream information corresponding to an object length has been reached, irrespective of when the second timer expires.

In one embodiment, a storage device includes a stream detector communicatively coupled to a plurality of flash memory devices, the stream detector is configured to determine whether a write data of a write command belongs to a first open stream of write data if a logical block address corresponding to the write data is consecutive to, or within a given distance from, a logical block address of the first open stream of write data. In one embodiment, the distance is adjustable. The distance may be adjusted based on a size of an object to be written, the type of object to be written, the location of related metadata, and so on. In one embodiment, the stream detector is configured to define the distance by setting a window having a lower and upper LBA within which the LBAs of the first open stream of write data is contained.

The stream detector is further configured to update the logical block address of the first open stream of write data to the logical block address corresponding to the write data and resetting a timer of the first open stream of write data if the write data is determined to belong to the open stream of write data. The stream detector is further configured to close the first open stream of write data when the timer expires. In one embodiment, the stream detector is further configured to write the first open stream of write data to a block of the flash memory devices after the first open stream of write data is closed.

In one embodiment, the storage device comprises an SSD. In one embodiment, the timer has a predetermined time. In another embodiment, the timer is adjusted based on a frequency of the stream detector receiving the write data belonging to the first open stream of write data. In another embodiment, the timer is adjusted based on a distance of the LBA of the received write data to the LBAs of the write data belonging to the first open stream of write data.

In one embodiment, the stream detector is further configured to create a second open stream of write data having a logical block address of the write data and start a second timer corresponding to the second open stream of write data if the write data is not determined to belong to the first open stream of write data. The stream detector is further configured to close the second stream of write data when the second timer expires. In one embodiment, the stream detector is further configured to write the second open stream of write data to a block of the flash memory devices after the second open stream of write data is closed.

In one embodiment, the stream detector is further configured to determine whether a read data corresponding to a read command for the read data stored in the flash memory devices is part of a stream of data. The stream detector is further configured to fetch the read data and place remaining stream of data in a memory buffer communicatively coupled to the stream detector, if the read data is determined to belong to the stream of data, and fetch the read data if the read data is not determined to belong to any stream of data.

In one embodiment, the stream detector is further configured to detect an object format of the write data and determine whether the object format corresponds to a known object format. The stream detector is further configured to open a second stream of write data and start a second timer for the second stream of write data if the object format is determined to correspond to the known object format. The stream detector is further configured to close the second stream of write data when the second timer expires. In one embodiment, the stream detector is further configured to extract stream information from the write data if the object format of the write data corresponds to the known object format. In one embodiment, the stream detector is configured to extract stream information by scanning a header of the write data. In one embodiment, the stream detector is further configured to close the second stream of write data when the stream information corresponding to an object length has been reached, irrespective of when the second timer expires.

DETAILED DESCRIPTION OF THE INVENTION

Figure 1:
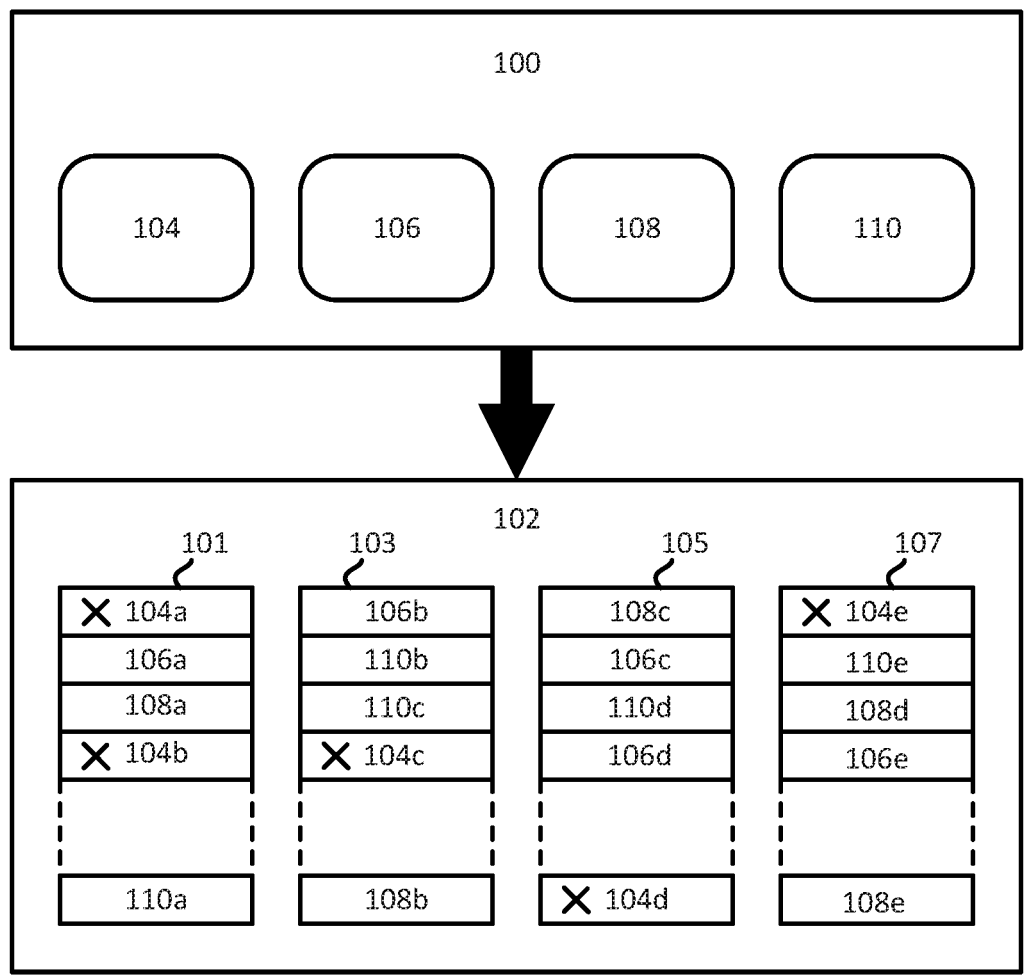
FIG. 1 is a block diagram of a host device storing data objects in a storage device, according to the prior art.
Figure 2:
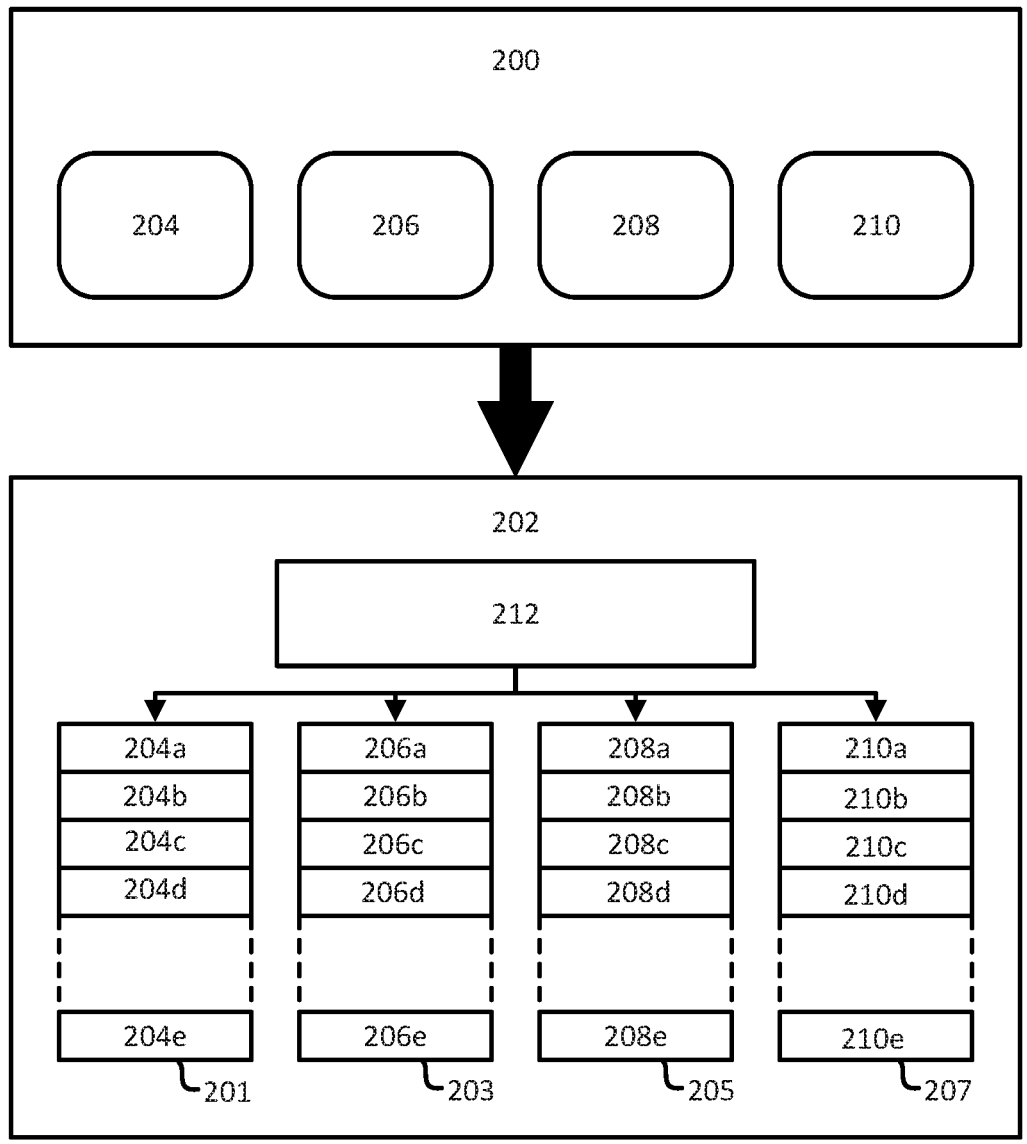
FIG. 2 is a block diagram of a host device storing data objects in a storage device, according to one embodiment of the invention.

FIG. 2 is a block diagram of a host device 200 storing data objects 204, 206, 208, and 210 in a storage device 202, according to one embodiment of the invention. The host device 200 may comprise any suitable computer system capable of running software applications, such as a personal computer, a workstation, etc. Host device 200 has one or more software applications writing data objects 204, 206, 208, and 210 to the storage device 202. While four data objects 204, 206, 208, and 210 are shown in FIG. 2 for illustrative purposes, the number of data objects to be written to the storage device 202 can be one or more. The storage device 202 is a flash-based storage device. In one embodiment, the storage device 202 is an SSD.

The storage device 202 is communicatively coupled to the host device 200. In one embodiment, the storage device 202 is internal to the host device 200. In this embodiment, the storage device 202 may be communicatively coupled to the host device 200 via any suitable communications interface, such as an interface that is compatible with the SERIAL AT ATTACHMENT (SATA) standard, the PERIPHERAL COMPONENT INTERCONNECT EXPRESS (PCIe) standard, the SMALL COMPUTER SYSTEM INTERFACE (SCSI) standard, or the like. In another embodiment, the storage device 202 may be external to the host device 200. In this embodiment, the storage device 202 may be located in a storage appliance, or configured to be a network-attached storage (NAS) device, or the like, and communicatively coupled to the host device 200 via the INTERNET or a network fabric.

The storage device 202 includes a stream detector 212 communicatively coupled to a plurality of blocks 201, 203, 205, and 207 of the storage device 202. Again, while four blocks 201, 203, 205, and 207 are shown in FIG. 2 for illustrative purposes, the number of blocks of the storage device 202 may be tens of thousands or more, depending on the number of flash memory devices contained within the storage device, the type of flash memory devices used (e.g.

single-level cell (SLC), multi-level cell (MLC), triple-level cell (TLC), etc.), and the storage capacity of the flash memory devices.

In operation, as the software application(s) running on the host device 200 write objects 204, 206, 208, and 210 to the storage device 202, the chunks of data 204*a-e*, 206*a-e*, 208*a-e*, and 210*a-e* that make up the objects 204, 206, 208, and 210, respectively, are detected by the stream detector 212. Data chunks 204*a-e*, 206*a-e*, 208*a-e*, or 210*a-e* that belong to the same object 204, 206, 208, or 210 are then grouped into streams of data by the stream detector 212 and written into blocks 201, 203, 205, and 207. As shown in FIG. 2, in this manner, the data chunks 204*a-e* corresponding to object 204 are written to block 201, the data chunks 206*a-e* corresponding to object 206 are written to block 203, the data chunks 208*a-e* corresponding to object 208 are written to block 25, and the data chunks 210*a-e* corresponding to object 210 are written to block 207.

Thus, when the objects 204, 206, 208, or 210 are deleted by the software applications, entire blocks 201, 203, 205, and/or 207 of the storage device 202 will be invalidated, reducing fragmentation within the blocks 201, 203, 205, 207, etc. and minimizing the amount of garbage collection that will need to be performed as there is no need to copy invalid pages to form invalid blocks for erasing—the blocks 201, 203, 205, and/or 207 are already comprised of invalid pages. This, in turn, reduces write amplification and improves the overall performance of the storage device 202 as fewer writes of the data stored in the storage device 202 are required.

In one embodiment, the stream detector 212 comprises a memory controller (not shown). In one embodiment, the stream detector 212 is a software module running on the memory controller (not shown). In this embodiment, the stream detector 212 may operate in collaboration with a flash translation layer (FTL) software of the memory controller. In another embodiment, the stream detector 212 is a component separate from the memory controller, and offloading stream detection from the memory controller. The stream detector 212 may include an address comparator (not shown) to compare the LBAs of chunks of data 204*a-e*, 206*a-e*, 208*a-e*, and 210*a-e*, as they are received with the LBAs of streams of data to determine whether the given incoming chunk of data 204*a-e*, 206*a-e*, 208*a-e*, and 210*a-e* belongs to a stream of data.

In one embodiment, when a new write command arrives from the host device 200 seeking to write a data chunk, such as 204*a-e*, 206*a-e*, 208*a-e*, or 210*a-e*, the stream detector 212 determines whether the incoming chunk has a logical block address (LBA) that is consecutive to, or within a given distance from, an open stream of recently received chunks. Chunks with consecutive LBAs that are received relatively close in time indicate that they belong to the same object to be written to the storage device 202. Similarly, chunks with LBAs that are within a given distance from LBAs of chunks belonging to an open stream that are received relatively close in time may also indicate they belong to the same object to be written to the storage device 202. The distance may depend on a number of factors, including the size of the object to be written, the type of object to be written, the location of the related metadata, etc. The distance may be defined by setting a window having a lower and upper LBA within which the LBAs of the open stream of write data is contained. The stream detector 212 maintains a stream ID, a current LBA, and a timer for each stream.

In one embodiment, if the stream detector 212 determines that the incoming chunk does have an LBA that is consecutive to, or within a given distance from, an open stream of recently received chunks, the stream detector 212 adds the incoming chunk to the open stream, updates the LBA of the open stream to the LBA of the incoming chunk, and resets the timer associated with the open stream. Otherwise, if the stream detector 212 determines that the incoming chunk does not have an LBA that is consecutive to, or within a given distance from, an open stream, then the stream detector 212 creates a new stream with the incoming chunk, assigns a stream ID, sets the LBA for the stream to be the LBA of the incoming chunk, and starts a timer. When subsequent incoming chunks of one or more objects are received, the stream detector 212 again determines whether those incoming chunks have LBAs that are consecutive to, or within a given distance from, any open streams, and if they are, adding them to the corresponding open stream, updating the stream's current LBA, and resetting the stream's timer, and if not, creating a new stream with a stream ID, and so on and so forth as previously described.

When a stream's timer expires, indicating that all of the chunks of the object have been received, the stream detector 212 closes the stream, releases the resources associated with the stream (i.e. stream ID, timer, etc.), and writes the chunks of the stream to one or more blocks of the storage device 202. In one embodiment, the timer is set to a predetermined time, taking into consideration the amount of time it is expected to take chunks of a data object to be received and processed by the stream detector 212. In one embodiment, the timer can be dynamically adjusted based on the frequency the host system 200 writes objects 204, 206, 208, 210, and so on, to the storage device 202. The timer can be lengthened or shortened depending on the frequency. If objects are written at a high frequency (i.e., with a shorter time between objects being written), the timer is shortened. Conversely, if objects are written at a low frequency (i.e., with a longer time between objects being written), the timer is lengthened.

In another embodiment, the timer is adjusted based on a distance of the LBA of the received chunk to the LBAs of the chunks belonging to the stream. If the distance of the LBA of the received chunk to the LBAs of the chunks belonging to the stream is small, then the timer is lengthened. Conversely, if the distance of the LBA of the received chunk to the LBAs of the chunks belonging to the stream is large, then the timer is shortened.

In one embodiment, the stream detector 212 determines an object format of the incoming chunk by matching the format of the incoming chunk with known object formats, such as a text document, an image, or a multimedia file. If the incoming chunk matches a known object format, the stream detector 212 creates a new stream with a stream ID, sets an LBA of the stream to the LBA of the incoming chunk, and starts a timer for the stream. In one embodiment, the stream detector 212 extracts stream information from the incoming chunk, including, for example, a length of the object to be written. In one embodiment, the stream detector 212 extracts the stream information by scanning a header of the incoming chunk.

The stream detector 212 can then use the extracted stream information to process the stream. For example, where the stream information is a length of the object to be written, the stream detector 212 does not need to rely on a timer, and instead, waits for the stream to reach the length, indicating that all of the chunks corresponding to the object have been received, and the stream can be closed and the chunks can be written to a block of the storage device 202. In another embodiment, the stream detector 212 uses the timer in conjunction with the extracted stream information to determine when to close the open streams. In one embodiment, the extracted object length is used in conjunction with the LBA of the incoming chunk to define a window having a lower and upper LBA within which the LBAs of the chunks belonging to the stream is contained, the window corresponding to a distance used by the stream detector 212 to determine whether the incoming chunk belongs to a given stream.

Figure 3:
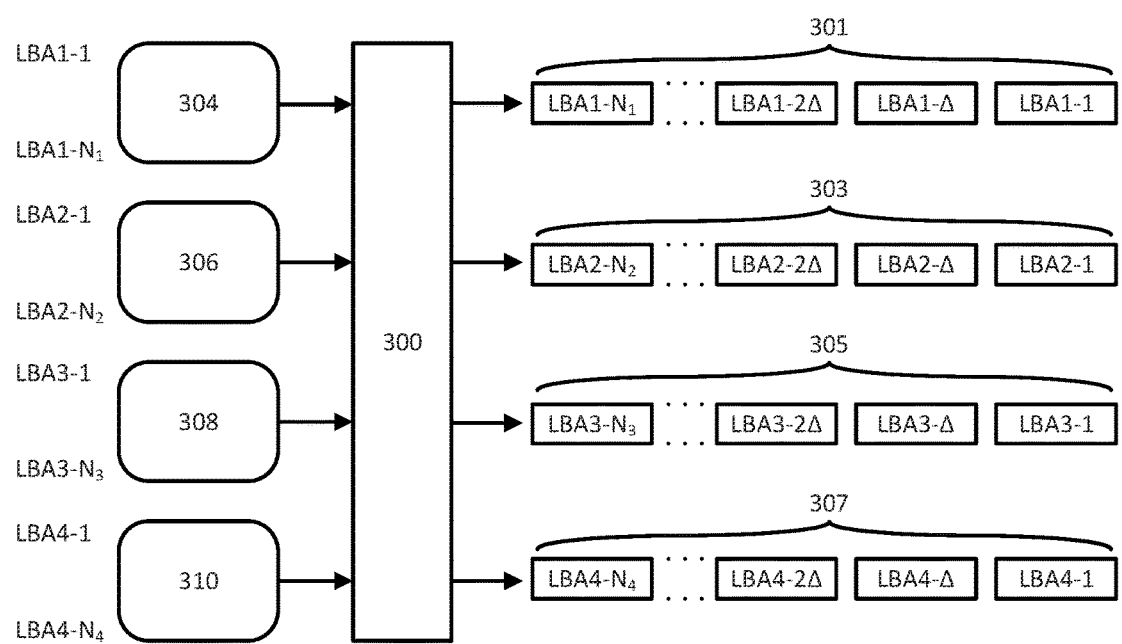
FIG. 3 is a block diagram of a stream detector assembling a plurality of data streams corresponding to a plurality of data objects, according to one embodiment of the invention.

FIG. 3 is a block diagram of a stream detector 300 assembling a plurality of data streams 301, 303, 305, and 307 corresponding to a plurality of data objects 304, 306, 308, and 310, according to one embodiment of the invention. As shown in FIG. 3, object 304 has an LBA range from LBA1-1 to LBA1-$N_1$, object 306 has an LBA range from LBA2-1 to LBA2-$N_2$, object 308 has an LBA range from LBA3-1 to LBA3-$N_3$, and object 310 has an LBA range from LBA4-1 to LBA4-$N_4$. Again, while four objects 304, 306, 308, and 310 are shown in FIG. 3 for illustrative purposes, the number of objects can be one or more. As data chunks of each of the objects 304, 306, 308, and 310 are received by the stream detector 300, the stream detector 300 detects whether the LBA of the chunk is consecutive to, or within a given distance from, a current LBA of one of the streams 301, 303, 305, or 307. In one embodiment, the distance corresponds to the window of LBA ranges LBA1-1 to LBA1-$N_1$, LBA2-1 to LBA2-$N_2$, LBA3-1 to LBA3-$N_3$, and LBA4-1 to LBA4-$N_4$ corresponding to the objects 304, 306, 308, and 310, respectively.

If the chunk does not have an LBA that is consecutive to, or within a given distance from, one of the streams 301, 303, 305, or 307, then the stream detector 300 will create a new stream, assign a stream ID, set a current LBA of the stream to the LBA of the chunk, and start a timer for the stream. If the chunk has an LBA that is consecutive to, or within a given distance from, one of the streams 301, 303, 305, or 307, then the stream detector 300 will add the chunk to the respective stream 301, 303, 305, or 307 to which the chunk belongs, updates the current LBA of the stream to the LBA of the chunk, and resets the timer for the stream.

For example, assuming a data chunk of object 304 having an LBA of LBA1-$N_1$ is received by the stream detector 300. The stream detector 300 determines whether the chunk has a consecutive LBA to, or an LBA within a given distance from, an existing open stream. Because the chunk is the first chunk of the object 304, the stream detector 300 determines that it does not have an LBA that is consecutive to, or within a given distance from, an existing open stream, and creates a new stream 301 having a stream ID, and assigns the current LBA of the stream 301 to be LBA1-$N_1$, and starts a timer for the stream 301. Subsequently, when the next chunk of object 304 having an LBA of LBA1-2Δ, for example, is received by the stream detector 300, the stream detector 300 determines that the chunk has a consecutive LBA of the stream 301 and adds the chunk to the stream 301, updates the current LBA of the stream 301 to LBA1-2 Δ, and resets the timer for the stream 301.

The stream detector 300 repeats the process until the chunks corresponding to the objects 304, 306, 308, and 310 have been assembled as streams 301, 303, 305, and 307. Once no further chunks of the objects 304, 306, 308, or 310 are received by the stream detector 300, the timer of the corresponding stream 301, 303, 305, or 307 expires. As the timers of each of the streams 301, 303, 305, and 307 expires, the stream detector 300 closes the streams 301, 303, 305, and 307 and writes the chunks of each of the streams 301, 303, 305, and 307 into one or more blocks, respectively.

In this manner, the stream detector 300 assembles the streams 301, 303, 305, and 307 corresponding to the objects 304, 306, 308, and 310 by automatically detecting the chunks that correspond to each object 304, 306, 308, or 310 as they are received. Thus, the chunks corresponding to objects 304, 306, 308, and 310 can be written to the same block or blocks, reducing fragmentation and write amplification, and subsequently improving the performance of a storage device. Moreover, because the stream detector 300 may reside internally within the storage device and operated as part of the storage device, such as the stream detector 212 of the storage device 202 shown and described in connection with FIG. 2, no modification of any software applications on a host device is required, and the present invention may be readily applied to existing systems.

Figure 4:
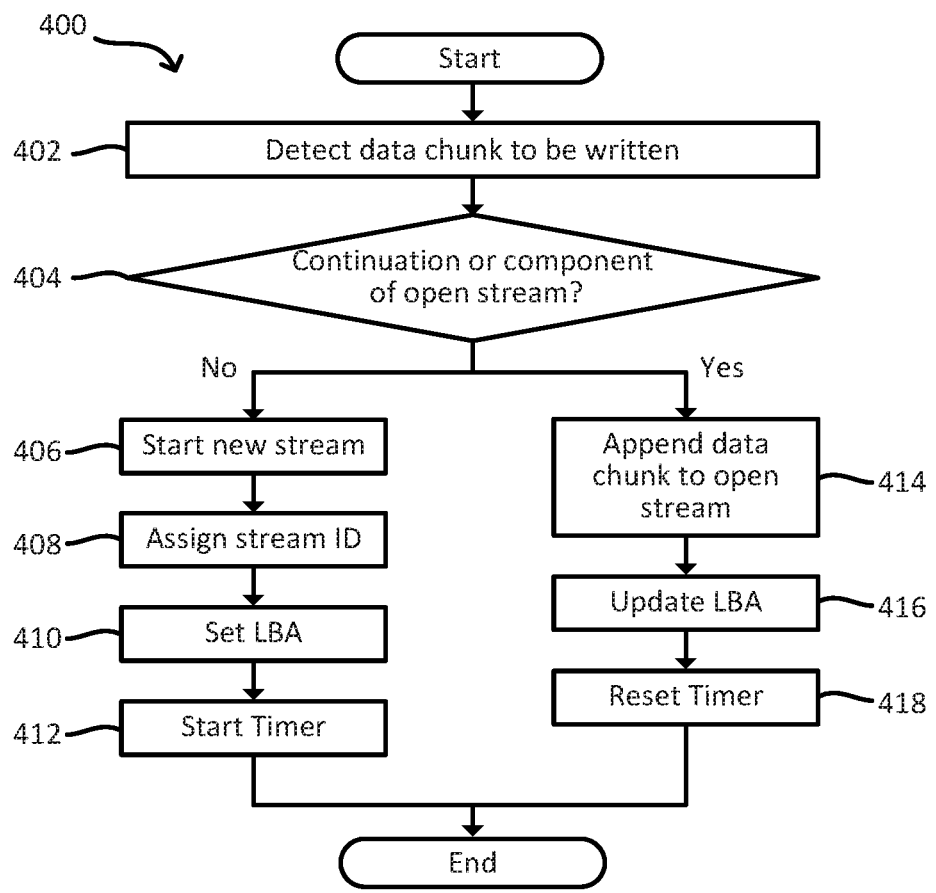
FIG. 4 is a flowchart of method steps for automatically detecting streams of data to be written to a storage device, according to one embodiment of the invention.

FIG. 4 is a flowchart of method steps 400 for automatically detecting streams of data to be written to a storage device, according to one embodiment of the invention. The storage device may be connected to a host system running software applications writing objects to the storage device, for example, as previously shown and described in connection with FIG. 2. At step 402, a chunk of data corresponding to an object sought to be written to a storage device is detected by the storage device. In one embodiment, the chunk of data is detected by a stream detector, for example, the stream detector 212 or 300 as shown and described in connection with FIGS. 2 and 3, respectively. At step 404, the storage device determines whether the chunk is a continuation or a component of an existing open stream of data.

If it is determined that the chunk is not a continuation or component of an existing open stream of data (i.e. its LBA is not consecutive to, or within a given distance from, any existing open stream of data), then at step 406 a new stream is created with the chunk. At step 408, a stream ID is assigned to the new stream, and at step 410, the current LBA of the stream is set to the LBA of the chunk. At step 412, a timer is started for the new stream. Otherwise, if it is determined that the chunk is a continuation or a component of an existing open stream of data (i.e. its LBA is consecutive to, or within a given distance from, an existing open stream of data), then at step 414 the chunk is added to the open stream. At step 416, the LBA of the open stream is updated to the LBA of the chunk, and at step 418, the timer of the open stream is reset. The method steps 400 are then repeated for subsequent chunks of data.

Figure 5:
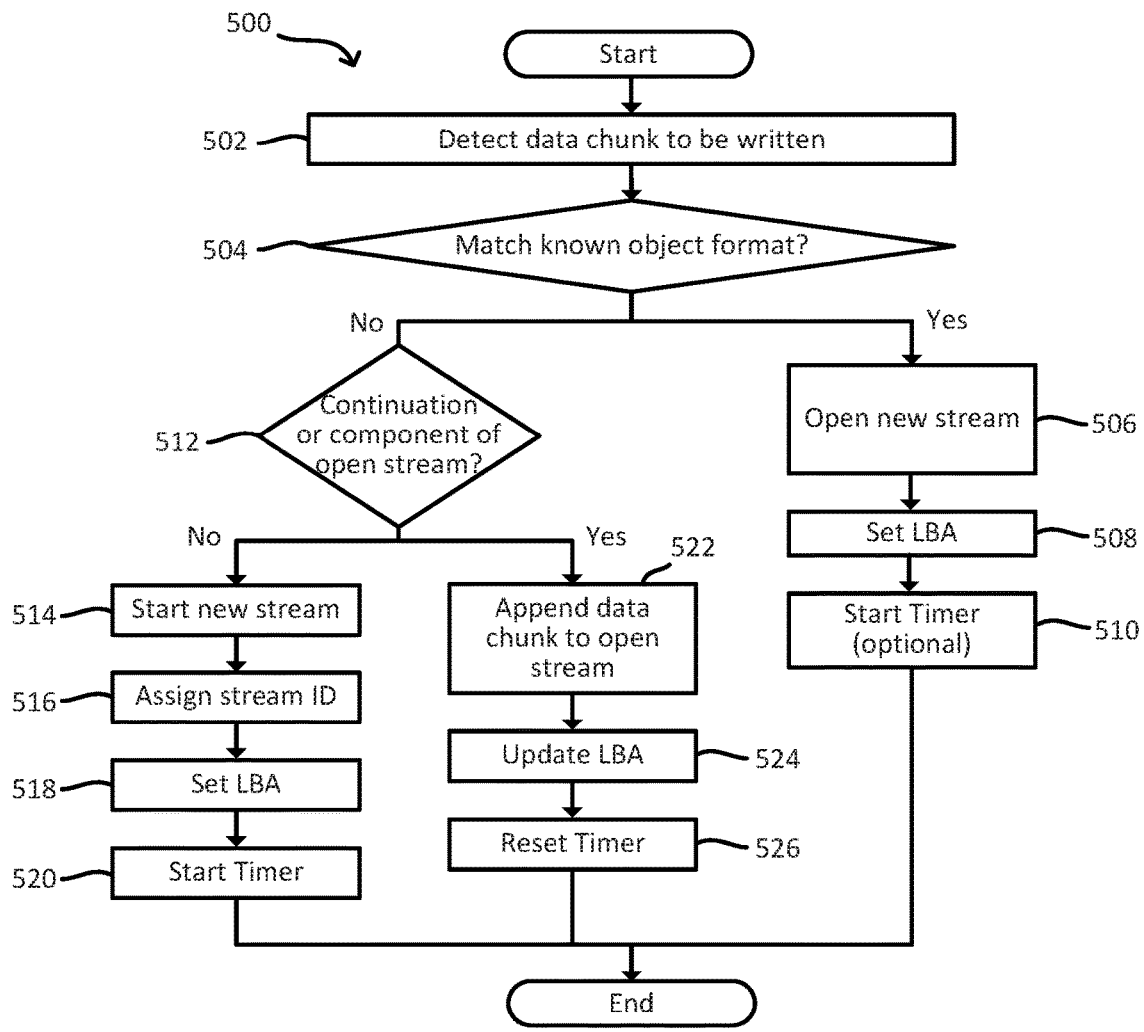
FIG. 5 is a flowchart of method steps for automatically detecting streams of data to be written to a storage device, according to another embodiment of the invention.

In one embodiment, the timer of the open stream or the new stream is set to a predetermined time, taking into consideration the amount of time it is expected to take chunks of a data object to be received. In one embodiment, the timer can be dynamically adjusted based on the frequency the storage device receives the chunks of an object. The timer can be lengthened or shortened depending on the frequency. In another embodiment, the timer is adjusted based on a distance of the LBA of the received chunk to the LBAs of the chunks belonging to the stream FIG. 5 is a flowchart of method steps 500 for automatically detecting streams of data to be written to a storage device, according to another embodiment of the invention. As with the method steps 400, the storage device of method steps 500 may be connected to a host system running software applications writing objects to the storage device, for example, as previously shown and described in connection with FIG. 2. At step 502, a chunk of data corresponding to an object sought to be written to a storage device is detected by the storage device. In one embodiment, the chunk of data is detected by a stream detector, for example, the stream detector 212 or 300 as shown and described in connection with FIGS. 2 and 3, respectively. At step 504, the storage device determines whether the chunk matches a known object format, such as a text document, an image, or a multimedia file, or the like.

If the chunk matches a known object format, then at step 506, a new stream is opened, and at step 508, the LBA of the new stream is set to the LBA of the chunk. In one embodiment, at step 510, a timer is started for the new stream. However, in another embodiment, stream information may be extracted from the chunk if it matches a known object format. Stream information may include, for example, a length of the object to be written. Stream information may be extracted by scanning a header of the chunk. Where the extracted stream information includes the length of the object, then a timer is not necessary for the new stream because the length of the object is already known. In this embodiment, setting the timer at step 510 is optional, and may be used in conjunction with the extracted stream information to better assemble the streams of data. In one embodiment, an extracted object length is used in conjunction with the LBA of the incoming chunk to define a window having a lower and upper LBA within which the LBAs of the chunks belonging to the stream is contained, the window corresponding to a distance used to determine whether the incoming chunk is a component of an open stream.

If the chunk does not match a known object format, then at step 512, it is determined whether the chunk is a continuation or a component of an existing open stream (i.e. does it have a consecutive LBA to, or an LBA within a given distance from, an existing open stream?). If not, then at step 514, a new stream is created, and a new stream ID is assigned to the new stream at step 516. At step 518, the current LBA of the new stream is set to be the LBA of the chunk, and a timer is started for the new stream at step 520. If the chunk is determined to be a continuation or a component of an existing open stream, then at step 522, the chunk is added to the existing open stream. At step 524, the current LBA of the existing open stream is updated with the LBA of the chunk, and at step 526, the timer for the existing open stream is reset. The method steps 500 are then repeated for subsequent chunks of data.

Figure 6:
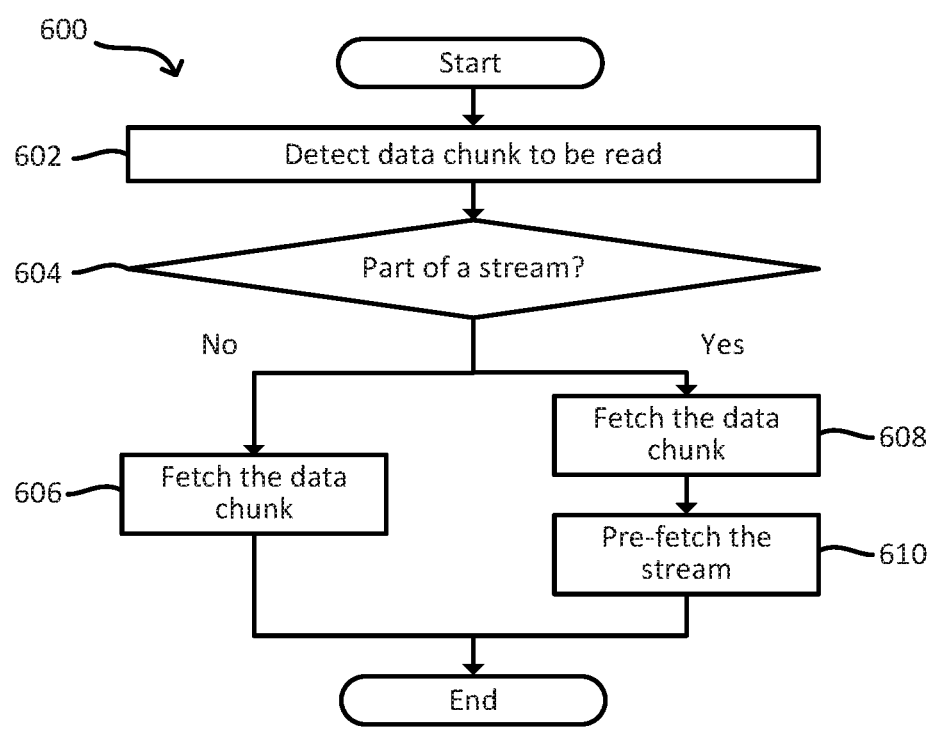
FIG. 6 is a flowchart of method steps for reading data stored in a storage device, according to one embodiment of the invention.

FIG. 6 is a flowchart of method steps 600 for reading data stored in a storage device, according to one embodiment of the invention. The storage device may be connected to a host system running software applications seeking to read objects previously written to the storage device in the manner as shown and described in connection with FIGS. 2-5. At step 602, the storage device detects a chunk of data corresponding to an object sought to be read from the storage device is detected by the storage device. In one embodiment, the chunk of data is detected by a stream detector, for example, the stream detector 212 or 300 as shown and described in connection with FIGS. 2 and 3, respectively. At step 604, the storage device determines whether the chunk is part of a stream of data that was previously written to the storage device.

If not, then at step 606, the data chunk is fetched by the storage device and sent to the host system that requested the data chunk. If the data chunk is part of a stream of data that was previously written to the storage device, then at step 608, the data chunk is fetched by the storage device and sent to the host system. At step 610, the storage device pre-fetches the rest of the stream of data to which the chunk belongs (which may include chunks of lesser or greater LBAs than the data chunk being fetched). In one embodiment, the storage device places the pre-fetched remainder of the stream of data into a memory buffer of the storage device, such as a dynamic random access memory (DRAM) buffer, which is typically faster than the persistent memory devices used to store the data. This way, subsequent read requests for the remainder of the stream of data can be processed more efficiently as the data has already been pre-fetched into the memory buffer, further improving the performance of the storage device.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A method of storing data received in one or more streams of write data in a storage device, comprising:
receiving, at a stream detector in the storage device, a write command comprising one or more write data chunks to be written to the storage device;
determining whether a first write data chunk of the one or more write data chunks belongs to a first open stream of write data if a logical block address of the first write data chunk is within a predetermined distance from a logical block address of a second write data chunk associated with belonging to the first open stream of write data;
adding, the first write data chunk to the first open stream of write data and starting a timer associated with the first open stream of write data if the first write data chunk is determined to belong to the first open stream of write data; and
closing the first open stream of write data when the timer expires.

2. The method of claim 1, wherein the predetermined distance is one logical block.

3. The method of claim 1, further comprising:
writing the first open stream of write data from the stream detector to a block of a flash memory device of the storage device after the first open stream of write data is closed.

4. The method of claim 1, further comprising:
if the write data is not determined to belong to the first open stream of write data,
creating a second open stream of write data,
adding the first write data chunk to the second open stream of write data;
starting a second timer corresponding to the second open stream of write data; and
closing the second open stream of write data when the second timer expires.

5. The method of claim 4, further comprising:
writing the second open stream of write data to a block of a flash memory device of the storage device after the second open stream of write data is closed.

6. The method of claim 1, further comprising:
receiving a read command for a read data chunk stored in the storage device;
determining whether the read data chunk corresponding to the read command is part of a stream of data that was previously written to the storage device;
fetching the read data chunk and placing the stream of data that was previously written to the storage device in a memory buffer if the read data is determined to belong to the stream of data; and fetching the read data chunk if the read data chunk is not determined to belong to any stream of data.

7. The method of claim 1, further comprising:

detecting an object format of the first write data chunk;

determining whether the object format corresponds to a known object format not associated with the first open stream of write data;

opening a second stream of write data, adding the first write data chunk to the second stream of write data and starting a second timer for the second stream of write data if the object format is determined to correspond to the known object format; and closing the second stream of write data when the second timer expires.

8. The method claim of claim 7, further comprising:

extracting stream information from the write data chunk if the object format of the write data chunk corresponds to the known object format.

9. The method of claim 8, wherein extracting stream information comprises scanning a header of the write data chunk.

10. The method of claim 8, further comprising:

closing the second stream of write data when the extracted stream information reaches a predetermined object length, irrespective of when the second timer expires.

11. The method of claim 1, wherein the timer has a predetermined time.

12. The method of claim 1, further comprising:

adjusting a time of the timer based on a frequency of receiving a series of write data chunks belonging to the first open stream of write data.

13. The method of claim 1, further comprising:

adjusting a time of the timer based on a distance of the logical block address of the write data chunk and the logical block address of a second write data chunk belonging to the first open stream of write data.

14. The method of claim 1, wherein the storage device comprises an SSD.

15. A storage device comprising:

a stream detector communicatively coupled to a plurality of flash memory devices configured to store data received in one or more streams of write data, wherein the stream detector is configured to:

determine whether a first write data chunk of a write command belongs to a first open stream of write data if a logical block address of the write data chunk is within a predetermined distance from a logical block address of a second write data chunk belonging to the first open stream of write data, add the first data chunk to the first open stream of write data and start a timer associated with the first open stream of write data if the first write data chunk is determined to belong to the open stream of write data, and close the first open stream of write data when the timer expires.

16. The storage device of claim 15, wherein the predetermined distance is one logical block.

17. The storage device of claim 15, wherein the stream detector is further configured to:

write the first open stream of write data from the stream detector to a block of the flash memory devices after the first open stream of write data is closed.

18. The storage device of claim 15, wherein the stream detector is further configured to:

create a second open stream of write data add the first write data chunk to the second open stream of write data and start a second timer corresponding to the second open stream of write data if the first write data chunk is not determined to belong to the first open stream of write data, and close the second open stream of write data when the second timer expires.

19. The storage device of claim 18, wherein the stream detector is further configured to:

write the second open stream of write data to a block of the flash memory devices after the second open stream of write data is closed.

20. The storage device of claim 15, wherein the stream detector is further configured to:

determine whether a read data chunk corresponding to a read command for the read data stored in the flash memory devices is part of a stream of data, fetch the read data chunk and place remaining stream of data in a memory buffer communicatively coupled to the stream detector if the read data chunk is determined to belong to the stream of data, and fetch the read data chunk, if the read data chunk is not determined to belong to any stream of data.

21. The storage device of claim 15, wherein the stream detector is further configured to:

detect an object format of the first write data chunk, determine whether the object format corresponds to a known object format not associated with the first open stream of write data, open a second stream of write data, add the first write data chunk to the second stream of write data and start a second timer for the second stream of write data if the object format is determined to correspond to the known object format, and close the second stream of write data when the second timer expires.

22. The storage device of claim 21, wherein the stream detector is further configured to:

extract stream information from the first write data chunk if the object format of the first write data chunk corresponds to the known object format.

23. The storage device of claim 22, wherein the stream detector is configured to extract stream information by scanning a header of the first write data chunk.

24. The storage device of claim 22, wherein the stream detector is further configured to:

close the second stream of write data when the extracted stream information reaches a predetermined object length, irrespective of when the second timer expires.

25. The storage device of claim 15, wherein the timer has a predetermined time.

26. The storage device of claim 15, wherein the timer is adjusted based on a frequency of the stream detector receiving a series of write data chunks belonging to the first open stream of write data.

27. The storage device of claim 15, wherein the timer is adjusted based on a distance between the logical block address of the first write data chunk and the logical block address of the second write data chunk belonging to the first open stream of write data.

28. The storage device of claim 15, wherein the storage device comprises an SSD.

* * * * *